United States Patent [19]

Choi

[11] Patent Number: 5,740,012

[45] Date of Patent: Apr. 14, 1998

[54] COMPUTER SYSTEM HAVING A STRUCTURE FOR EASY ASSEMBLING/ DISASSEMBLING OF PERIPHERAL EQUIPMENT

[75] Inventor: Phil-Kyu Choi, Suwon-si, Rep. of Korea

[73] Assignee: SamSung Electronics Co., Ltd., Suwon, Rep. of Korea

[21] Appl. No.: 714,334

[22] Filed: Sep. 18, 1996

[30] Foreign Application Priority Data

Oct. 30, 1995 [KR] Rep. of Korea ............... 95-38056

[51] Int. Cl.⁶ .................. H05K 7/14; H01K 13/639
[52] U.S. Cl. ............... 361/686; 361/685; 361/726; 439/159
[58] Field of Search .................. 361/680, 681, 361/683, 685, 686, 724–727, 684; 364/708.1; 439/152–160; 360/99.06; G06F 1/16

[56] References Cited

U.S. PATENT DOCUMENTS

| | | |
|---|---|---|
| 4,749,364 | 6/1988 | Arney et al. . |
| 4,833,554 | 5/1989 | Dalziel et al. ............. 360/98.04 |
| 4,858,162 | 8/1989 | Kieffer et al. . |
| 4,926,365 | 5/1990 | Hsieh . |
| 5,050,041 | 9/1991 | Shafi . |
| 5,058,045 | 10/1991 | Ma . |
| 5,305,180 | 4/1994 | Mitchell et al. . |
| 5,309,323 | 5/1994 | Gray et al. ............... 361/726 |
| 5,310,358 | 5/1994 | Johnson et al. ............ 439/358 |
| 5,311,455 | 5/1994 | Ho . |
| 5,379,184 | 1/1995 | Barraza et al. ............ 361/685 |
| 5,428,355 | 6/1995 | Jondrow et al. . |
| 5,526,226 | 6/1996 | Katoh et al. . |
| 5,539,616 | 7/1996 | Kikinis ............... 361/686 |

OTHER PUBLICATIONS

"OEM Magazine", vol. 4, No. 30, Aug. 1996, pp. 60–68, Boyd–Merritt, R., Notebook Theater, a CMP Publication.

*Primary Examiner*—Lynn D. Feild
*Attorney, Agent, or Firm*—Robert E. Bushnell, Esq.

[57] ABSTRACT

A computer system has a structure for assembling and disassembling of peripheral components, comprising a computer and a peripheral component capable of being connected and disconnected to the computer. An aperture secures the peripheral component after a connection to the computer. A latch allows the peripheral components to be connected or disconnected to the computer upon user manipulation of a lever controlling the position of a protrusion, the position of the protrusion being in and out of the aperture.

13 Claims, 4 Drawing Sheets

1

COMPUTER SYSTEM HAVING A STRUCTURE FOR EASY ASSEMBLING/ DISASSEMBLING OF PERIPHERAL EQUIPMENT

CLAIM OF PRIORITY

This application makes reference to, incorporates the same herein, and claims all benefits accruing under 35 U.S.C. § 119 from an application for A Computer System Having a Structure For Easy Assembling/Disassembling Of Peripheral Equipment earlier filed in the Korean Industrial Property Office on 30 Oct. 1995, and there duly assigned Ser. No. 38056/1995.

BACKGROUND OF THE INVENTION

The present invention relates to portable computers generally, and more particularly, to the integration of peripheral components into a computer system.

Recently, portable computers have become popular as they permit a user to do work out of the office. I have found that the recent efforts in the art fail to provide housing for computer systems that are able to readily engage, accept and discharge peripheral components such as a compact diskread only memory (i.e., CD-ROM) drive to or from the computer system. All too often, contemporary designs require that the entire system must be taken apart and re-assembled in order for the CD-ROM to be installed or removed. This is complicated and cumbersome.

Boyd-Merritt (*Notebook Theater*, pages 60–6, especially page 64, OEM, August, 1996) speculates on the future of notebook computers, and shows an abstract representation of a front-loading notebook computer. Other contemporary designs are illustrated by Katoh et at. (U.S. Pat. No. 5,526, 226, Information Processing Apparatus And Device Accommodated Therein With a Mechanism For Locking a Cover, 11 Jun. 1996) showing a latch which may be utilized in conjunction with a card port in order to engage a PCMCIA card and prevent removal. Jondrow et al. (U.S. Pat. No. 5,428,355, Position Encoder System, 27 Jun. 1995) shows a retractable and extendable handle; however, the handle is not readily removable. Ho (U.S. Pat. No. 5,311,455, Portable Computer Having a Hard Disk Drive Mounted Therein, 10 May 1994) shows a removable disk drive. Mitchell et al. (U.S. Pat. No. 5,305,180, Disk Drive Ejector Mechanism With Latch And Ejector And Standby Switch, 19 Apr. 1994) also shows a removable disk drive. The latch of Mitchell et al. '180 uses more parts than I believe to be necessary, a fertile source of equipment failure. For example, the latch of Mitchell et al. uses a button and does not permit a direct user manipulation on the handle of the latch. Ma (U.S. Pat. No. 5,058,045, Battery And Expansion Slot Changeable Computer, 15 Oct. 1991) discusses a battery and expansion slot changeable computer mainframe structure for lap-top and note book. Shaffi (U.S. Pat. No. 5,050,041, Modem Mountable In Wall Of A Computer Housing With Readily Accessible, On/Off Switch, Indicator Means And Internal Switch Connecting Either Modem Or An Auxiliary Serial Port To An I/0 Port, 17 Sep. 1991) discusses a modular modem device suitable for insertion into a slot provided in the front or side wall of a computer housing. Hsieh (U.S. Pat. No. 4,926,365, Portable Computer System, 15 May 199) discusses a removable battery box, while Kieffer et al. (U.S. Pat. No. 4,858,162, Method And Apparatus Used In Mounting Expansion Cards, 15 Aug. 1989) discusses an interface card that is adapted to attach to the portable computer's expansion slot. Arney et al. (U.S. Pat. No.

2

4,749,364, Display Attachment Apparatus, 7 Jun. 1988) teaches an apparatus for attaching display apparatus such as an LCD screen to electrical apparatus. Collectively, these references teach a single peripheral component per type of latch; I have found however, that the several designs provided by these references are unable to accommodate a multitude of different types of peripheral components to the computer, and require a different type of latch tailored to the specifications of each peripheral component. Furthermore, portable computers generally provide attachment slots at the side of the computer, thus unnecessarily pre-emptying otherwise occupied (and gainfully employed) space at the side of the computer.

SUMMARY OF THE INVENTION

Accordingly, it is an object of the present invention to provide an improved portable computer.

It is another object to provide a housing for a portable computer that readily permits insertion and removal for a battery, CD-ROM, a hard disk, and other peripheral, and memory components for the computer system, by a simple manipulation by the user.

It is yet another object to provide a housing for a computer system able to accommodate insertion and removal of peripheral devices along axes extending between the base of the computer and the torso of the user of that computer.

It is still another object to equip a housing for a computer system with a self-latching mechanism for securing the maintenance of data and electrical power connections between peripheral modular data and electrical power units and the computer system.

It is still yet another object to equip a housing for a computer system with a latch able to break data and electrical connections between a peripheral modular memory or electrical power unit wherever the latch is manipulated to release the unit.

It is also an object to provide a one-piece, monolithic biased latch that responds to insertion of a modular peripheral unit for a computer system by automatically latching the modular unit into a fully inserted position and that responds to direct user opening of the latch against the force of the bias by breaking data and electrical power connections between the computer and the modular unit while partially ejecting the modular unit from its bay within the housing of the computer system.

To achieve these and other objects, the present invention provides a computer's system having a housing with a monolithic biased latch for directly receiving and discharging of peripheral components either toward or alternatively, along side the user, thereby enabling easy installation and quick removal of a modular peripheral component and the simultaneous establishment or interruption of electrical power and operational connections between the computer's system and the peripheral component. The latch allows the peripheral components to be slidingly connected to the computer system, while the module of the peripheral component cooperates during insertion with the biased latch by receiving and allowing the latch to secure the peripheral component within the housing after forming data and electrical power connections inside the computer. The latch breaks the data and the electrical power connections between the peripheral component and computer and simultaneously partially ejects the peripheral component from the computer's system upon user manipulation of the latch out of engagement with the peripheral component.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
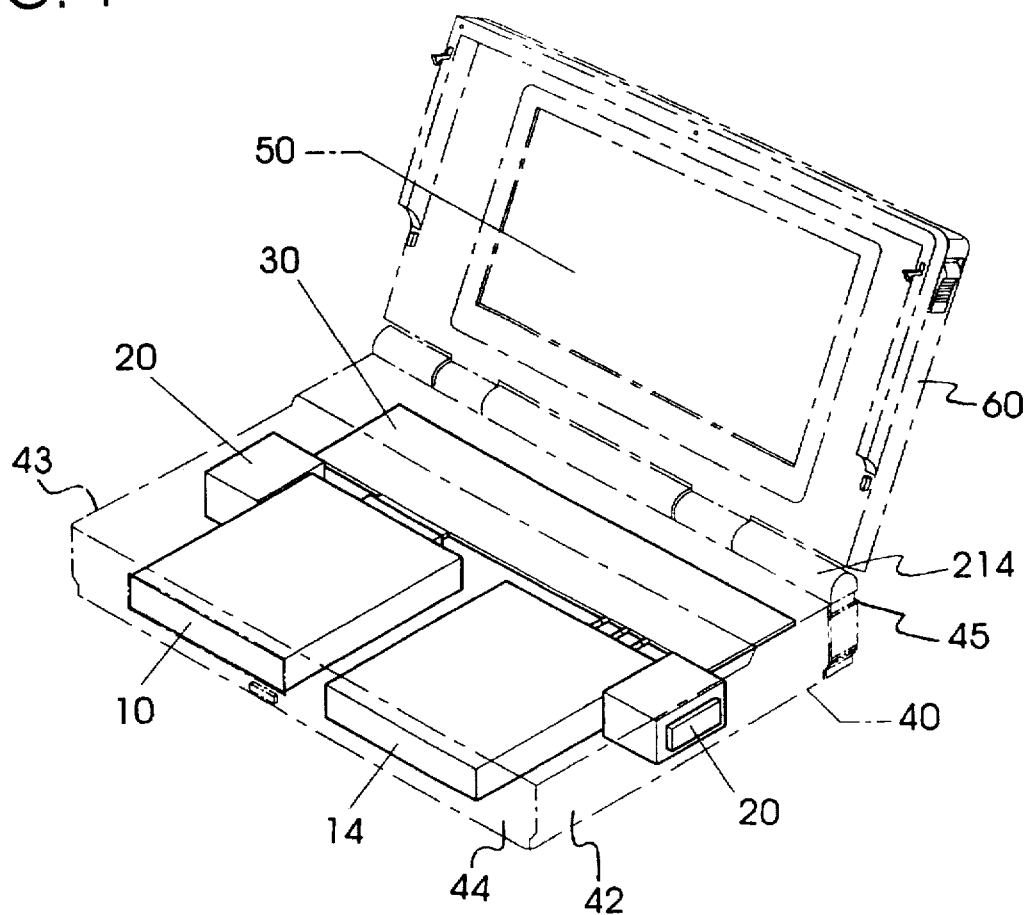
FIG. 1 is an isometric view of a portable computer system having a structure enabling insertion and removal of peripheral components, constructed according to the principles of the present invention.

Referring now to the drawings, FIG. 1 illustrates a portable computer system including a structure of a housing 40 for the computer that accommodates manual insertion and removal of modular peripheral units such as a CD-ROM drive 10, a dry cell battery 14, a floppy disk drive (not shown) or a modular television tuner (also not shown). The portable computer system as illustrated, includes a modular CD-ROM drive 10, a first latch 20, a modular battery 14, a second latch 20, a motherboard 30 for the computer, the body of the housing 40 for the computer, a visual video screen 50 such as a liquid crystal display, and a cover 60 forming a bezel and case for screen 50.

Figure 2:
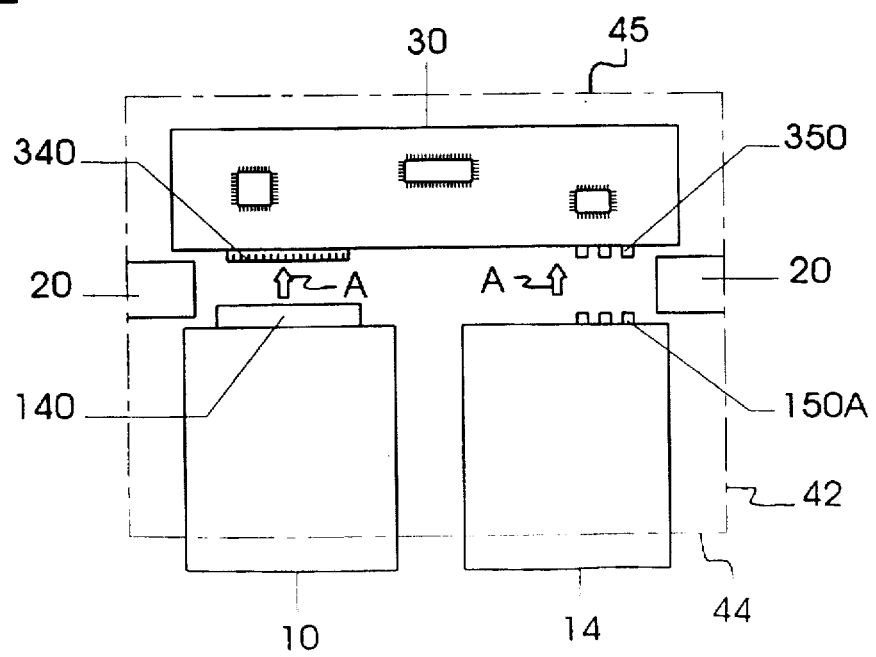
FIG. 2 is a plan view of a portable computer system providing a housing with a structure for insertion and removal of peripheral components, constructed according to the principles of the present invention.

FIG. 2 illustrates the components of the portable computer system. CD-ROM drive 10 and battery 14 are easily manually insertable into separate and discrete bays within the interior of housing 40 to connect to motherboard 30 by moving through apertures in front wall 44 in the direction of arrow A, until drive 10 is wholly within its bay formed within housing 40, beneath the keyboard (not shown) for the system. CD-ROM drive 10 connects to the motherboard 30 via a single board mounted (e.g., a surface mounted) plug and socket connection of CD-ROM drive's combined electrical power and data bus connector 140 to motherboard connector 340. Latch 20 secures CD-ROM drive 10 within its bay inside housing 40, thereby maintaining electrical continuity between drive 10 and motherboard 30. Battery 14 connects to motherboard 30 via a surface mounted plug and socket connection of power source port 150A of battery 14 with power source port 350 of motherboard 30. The latch 20 secures battery 14 within the conformal interior bay inside housing 40, thereby assuring electrical continuity of the connection between battery 14 and motherboard 30. This illustrates this monolithic latch 20 providing a self-latching of the battery 14.

Figure 3:
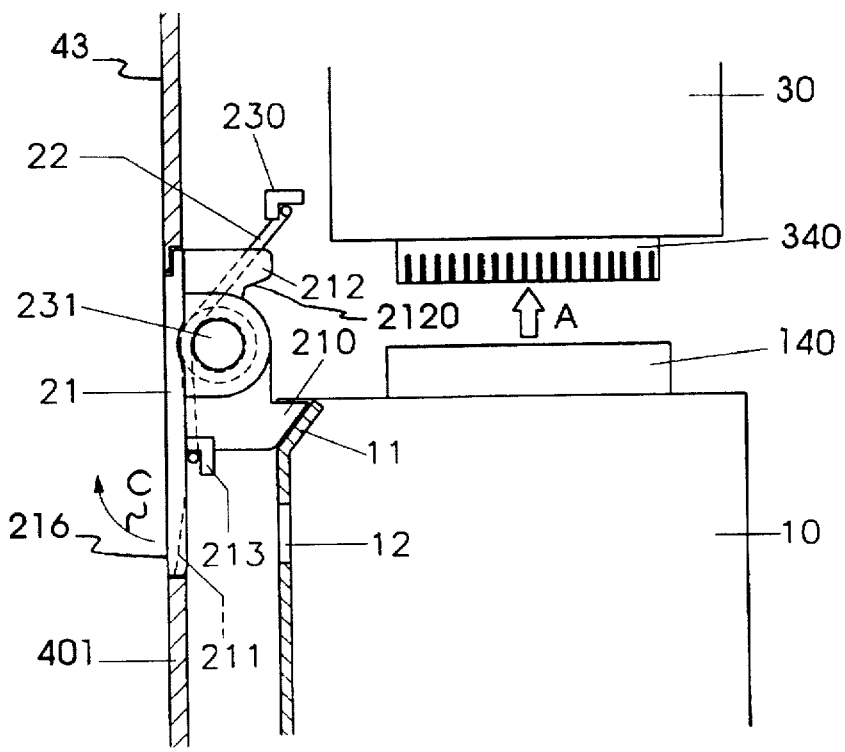
FIG. 3 illustrates one step in a process of installing a CD-ROM module within a peripheral bay of a housing for a portable computer during insertion and removal of peripheral components, constructed according to the principles of the present invention.
Figure 4:
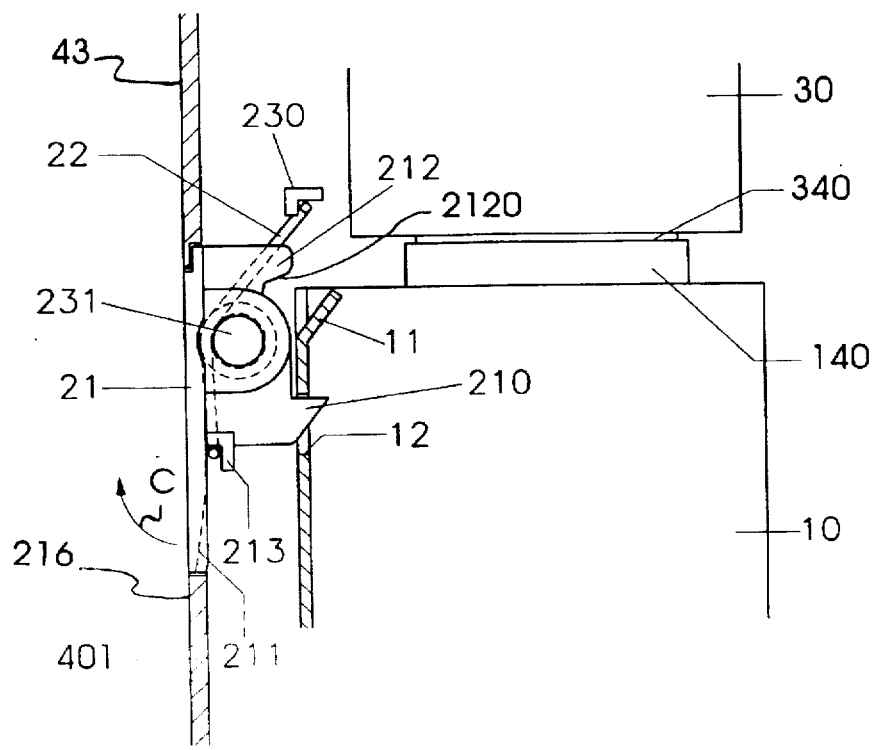
FIG. 4 is a plan view showing completion of the installation of a CD-ROM within a housing for a portable computer according to the principles of the present invention.
Figure 5:
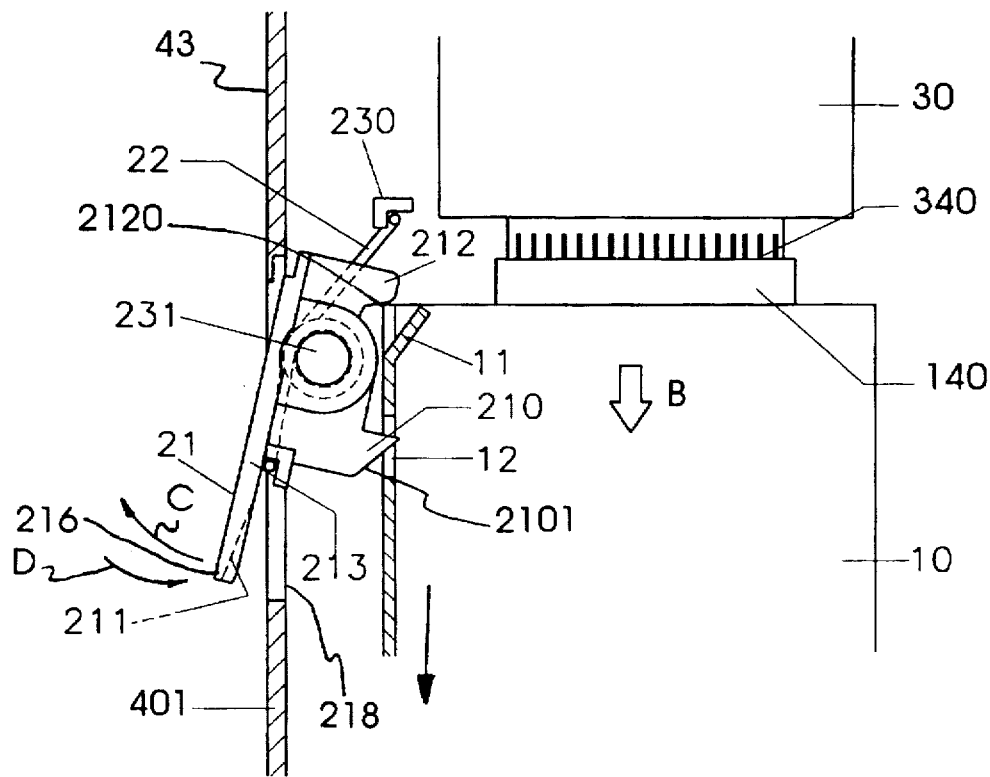
FIG. 5 illustrates a detail showing one step in a process of separating a CD-ROM from a housing for a portable computer, according to the principles of the present invention.
Figure 6:
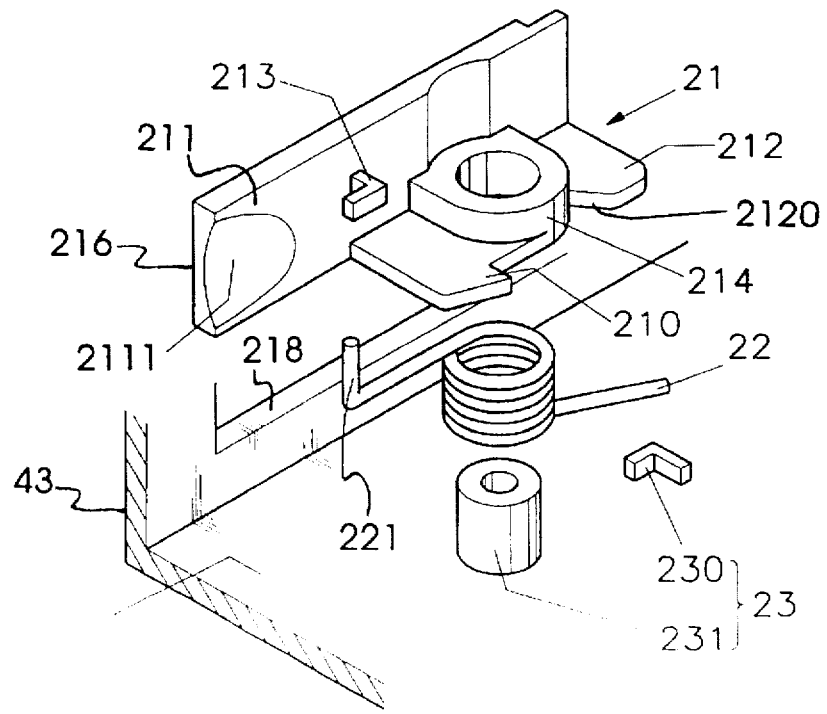
FIG. 6 is an exploded perspective view illustrating a latch for a computer system constructed according to the principles of the present invention.

FIG. 3 illustrates a step in the insertion of a modularly packaged CD-ROM drive 10. This step uses a slide 11 formed at one corner of the modular housing of CD-ROM drive 10, for allowing easy mounting in a within one of the internal bays of computer; a CD-ROM drive 10, which is capable of being removed or of being installed, and has an aperture 12 formed in one side wall 16 for securing the CD-ROM drive 10 within its bay; and a latch 20, which permits the CD-ROM drive to be either in a detained state as represented by FIG. 4, or in a removable state as represented by FIG. 5. The CD-ROM drive can be removed through movement of distal edge 212 (a projection) of lever 21 having a camming surface 2120. This removal, the initial ejection of the CD-ROM drive, interrupts the electrical connection between the CD-ROM drive and the computer. The protrusion 210 (projection) is able to hook into an aperture 12 of the CD-ROM drive 10. By a user manipulation, the state can be changed: either the state of being hooked or the state of being un-hooked from the aperture 12 of the protrusion 210. Under the influence of a bias created by spring 22, detent 210 normally rests within aperture 12 while the modular housing of a peripheral unit such as CD-ROM drive 10 or battery 14 is at rest and fully inserted within a bay inside housing 40, and obstructs both deliberate efforts to normally pull the module out of its bay as well as inadvertent shippage between connectors 140, 340 due to external forces such as relatively long term vibration applied to housing 40.

The latch 20 includes a lever 21, which rotates to allow connector 140 of CD-ROM drive 10 to be easily separated from the connector 340 of the computer system after the user prys the distal end 216 of level 21 outwardly from its rest position within aperture 218, where the exterior surface of lever 21 lies flush against the exterior surface of sidewall 43 under the influence of spring 22 thereby forcing camming surface 2120 against the uppermost left corner of the modular housing for CD-ROM drive 10, and simultaneously driving CD-ROM drive 10 in the direction of arrow B, to protrude outwardly from its bay and beyond front wall 44. A detent 23, formed on the computer housing 401, fixes and is central to the rotation of the elastic member 22 and the lever 21.

The lever 21 includes an indented handle 211 (an elongated member) having a flush indent 2111 and located on the outer portion of the computer housing so that it is easily operated by the user. The detent 213 of the lever is hook-shaped to catch the torsion spring 22.

The detent 23 of the latch 20, formed on the computer housing 401, includes a spring hook 230 for detaining the other end of the elastic member 22, and a boss 23 1 which is in the center of rotation, is used with the lever 21 and elastic member 22.

Figure 7:
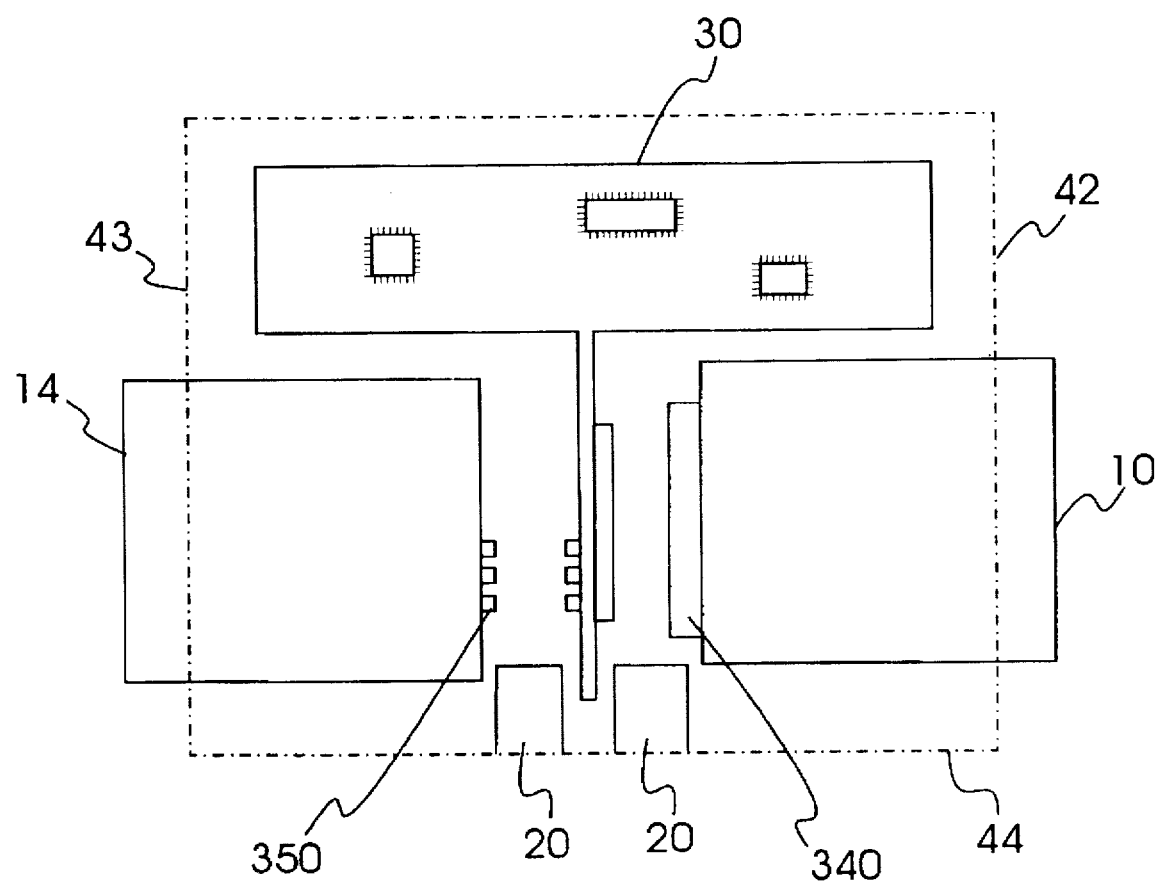
FIG. 7 is a plan view of an alternative embodiment of a portable computer system providing a housing with a structure for insertion and removal of peripheral components, constructed according to the principles of the present invention.

FIG. 7 illustrates the components of an alternative embodiment of a portable computer system. CD-ROM drive 10 and battery 14 connect to motherboard 30 by moving through apertures in side wall 42, until drive 10 is wholly within a bay formed within housing 40, beneath the keyboard (not shown) for the system. CD-ROM drive 10 connects to the motherboard 30 via a surface mounted plug and socket connection of CD-ROM drive data bus connector 140 to motherboard connector 340. Latch 20 secures CD-ROM drive 10 within its bay inside housing 40, thereby maintaining electrical continuity between drive 10 and motherboard 30. Battery 14 connects to motherboard 30 via a surface mounted plug and socket connection of power source port 150A of battery 14 with power source port 350 of motherboard 30. The latch 20 secures battery 14 within the conformal interior bay inside housing 40, thereby assuring electrical continuity of the connection between battery 14 and motherboard 30. This illustrates this monolithic latch 20 providing a self-latching of the battery 14.

The following depicts an operation of the structure of the computer that provides for easy insertion and removal of peripheral components according to an embodiment of the present invention.

First, by referring to FIGS. 3 through 7 collectively, the installation of a CD-ROM drive in a computer system shall be explained. In order to mount the CD-ROM drive 10 to a motherboard of the computer system, the user, pushes the CD-ROM drive in the direction of the arrow A. As is illustrated in FIGS. 3 and 7, the slide 11 of the CD-ROM drive 10 pushes the protrusion 210 of the latch 20, and the protrusion 210 turns clockwise on the hinge 214. The lever 21 of the latch 20 moves outward in the direction of the arrow C by the CD-ROM drive 10.

After the above operation, when the CD-ROM drive 10 is completely mounted in the motherboard connector, as is shown in FIG. 4, the CD-ROM drive 10 connector and the motherboard connector become fully assembled together. Because of the elasticity of the torsion spring 22, the lever 21 of the latch 20 that moves in the direction of the arrow D in FIG. 3, returns to its original state. Protrusion 210 inserts into the aperture 12 of the CD-ROM drive 10, and, as a result, the CD-ROM drive becomes detained.

Next, by referring to FIG. 5, separating the CD-ROM drive from the computer shall be explained. The user, in order to separate the CD-ROM drive that is combined with the motherboard connector and mounted to the computer system, puts his/her finger on the indented handle 211 of the latch, lever 20 and pulls in the direction of the arrow C. This action rotates the lever 21. As is illustrated in FIG. 5, if the lever 21 is rotated toward the direction of arrow C, the separation projection 212 is also rotated clockwise. This results in the backside of the CD-ROM drive 10 being pushed in the direction of arrow B. Because the distance between the hinge 214 (ferrule) and the further end of the handle 211 is greater than that between the hinge 214 and separation projection 212, the user need only apply limited pulling power to the handle 211 to in order to give sufficient power to the separation projection 212, thus pushing away the CD-ROM drive 10.

In the above operation, as the CD-ROM drive moves in the direction of the arrow B of FIG. 5, the CD-ROM is disconnected from the motherboard connector and is easily removed from the computer system.

In the computer system illustrated in FIGS. 1 and 2, a battery 14, having a slide 11 for easy mounting and an aperture 12 for detaining the battery after installation, can use the homologous process of separation and mounting of the CD-ROM drive by using the latch 20 mounted in the right side of the computer system, and, thus, can be easily mounted to and separated from the computer system.

As the principles noted above are applicable to any other peripheral component of a computer, the present invention is not limited to CD-ROM drives and batteries. Accordingly, the present invention, operated in the above manner, allows the user to easily install and remove a CD-ROM drive, battery, and other peripheral components such as a modem in a computer system. Further this simplifies the manufacturing process.

While this invention has been described in connection with preferred embodiment, it is to be understood that the invention is not limited to the disclosed embodiments, but, on the contrary, it is intended to cover various modifications and equivalent arrangements included within the spirit and scope of the appended claims.

What is claimed is:

1. A computer system, comprising:
   a computer having a case enclosing a motherboard, a first wall, a second wall extending generally orthogonally to said first wall and being perforated by a plurality of orifices, said second wall providing access to each of a plurality of discrete bays inside said case, and a cover encasing a visual display panel providing varying visual displays of information under control of said motherboard; and a latch comprising:
      a one piece monolithic lever;
      a torsion spring wound around said lever, biasing said lever to rotate;
      a detent, formed on said computer case, fixing said torsion spring and said lever to said computer case, said latch being mounted on said case, providing a self-latching of a peripheral component within the corresponding one of said bays, in response to insertion of a peripheral component operationally participating in said control while within said corresponding one of said bays, by directly engaging the peripheral component, said computer case exposing said latch to manipulation by a user, said latch responding to said manipulation by disconnecting said peripheral component from said motherboard;

said latch maintaining an electrical connection between said computer and the peripheral component during said self-latching, said latch simultaneously interrupting said electrical connection between said computer and the peripheral component and providing a partial initial ejection of the peripheral component from said corresponding one of said bays in response to manipulation of said latch.

2. The computer system of claim 1, wherein said first wall is a front wall of said case and said second wall is a side wall of said case.

3. The computer system of claim 1, wherein said first wall is a side wall of said case and said first wall is a front wall of said case.

4. The computer system of claim 1, with said bays defining parallel paths of travel of the peripheral component during said insertion and said ejection through each one of said bays, said lever comprised of:
   an elongate member;
   a ferrule pivotally supported by said case to rotate around an axis obliquely intersecting said paths of travel, adjoining said elongate member;
   a first projection adjoining said elongate member and having a first camming surface extending into a first one of said paths of travel, said first projection responding to contact between said first camming surface and the peripheral component during said insertion by rotating said lever along a first arc and out of said first one of said paths of travel, and said sensing interruption of said contact by rotating with said lever along a second and opposite arc to provide said self-latching;

a second projection adjoining said elongate member and having a second camming surface responding to rotation of said lever along said first are engaging and driving the peripheral component during said ejection along a second one of said paths of travel opposite to said first one of said paths of travel.

5. A computer system comprising:

a portable computer capable of computing, having a motherboard, a motherboard connector, a computer body with a computer case, a visual display monitor, a cover, and a power source port, said motherboard connector located at a front of said computer, said power source port located at said front of said computer;

a first peripheral component to be connected or disconnected to said computer, said first peripheral component having a memory addressable by said computer, a slide capable of moving said first peripheral component, an aperture capable of securing after connecting to said computer, and a peripheral component connector capable of connecting to said motherboard connector, said computer being capable of greater number of functions upon connection to said first peripheral component; and a second peripheral component having a power source port, said second peripheral component being capable of connection and disconnection to said computer, providing electrical energy to drive said computer and said first peripheral component, said computer being capable of greater functions and capable of functioning for a longer period of time upon connection to said second peripheral component;

a latch allowing said first peripheral component to be detached from, attached to, and secured to said computer upon a user manipulation, said latch comprising a first protrusion providing positions of in and out of said aperture, a second protrusion for applying force to a front of said first peripheral component, a torsion spring having a first end detained by a first detent, a hook-shaped rotatable lever controlling said position of said first protrusion by applying force to said first protrusion upon said user manipulation, a second detent having a hook and a boss, and an indented handle, said rotatable lever securing said first peripheral component to said computer by inserting said first protrusion to said aperture, and pushing a back side of said first peripheral component upon said user manipulation, said rotatable lever detaching said first peripheral component from said computer by pushing said front of said first peripheral component.

6. A computer system, comprising:

a computer having a housing, a motherboard, a first power source port permitting connection to at least one peripheral component, and at least one motherboard connector permitting connection to at least one peripheral component, said first power source port located at said front of said computer, said motherboard connector located at said front of said computer;

a pair of latches;

a first peripheral component having a memory addressable by said computer, an electrical peripheral component connector, and an aperture to assist in securing said peripheral component to said motherboard after connecting to said computer, said first peripheral component capable of being connected and disconnected to said computer by a first of said pair of latches and providing electrical energy driving said computer; and a second peripheral component having a second power source port, said second peripheral component capable of being connected and disconnected to said computer by a second of said pair of latches;

said first of said pair of latches protruding from said computer housing allowing said first peripheral component to be connected and disconnected to said computer, securing said peripheral component to said computer upon a user manipulation of a first rotatable lever connected to said first of said pair of latches, said first rotatable lever controlling positions of a first protrusion of said first of said pair of latches said first protrusion being in and out of said aperture.

7. The computer system of claim 6, wherein said first rotatable lever secures said first peripheral component to said computer by inserting said first protrusion to said aperture, and upon said user manipulation said first rotatable lever detaching said first peripheral component by pushing a back side of said first peripheral component by using a separation projection and by pushing a front of said first peripheral component with a second protrusion.

8. The computer system of claim 7, wherein each of said pair of latches further comprises:

an elastic member including a first end, said first end detained by a first detent; and a second detent located on said housing, for detaining said elastic member and said lever.

9. The computer system of claim 8, said rotatable lever further comprising a handle, said handle being handled by a user from outside of said computer and being indented so that said user can easily manipulate said rotatable lever.

10. The computer system of claim 9, wherein said first detent of said rotatable lever is hook-shaped.

11. The computer system of claim 8, wherein said elastic member is a torsion spring.

12. The computer system of claim 8, wherein said second detent of each of said pair of latches further comprises:

a hook for detaining a second end of said elastic member; and a boss for rotating said rotatable lever and said elastic member.

13. A computer system, comprising:

a portable computer capable of computing, having a motherboard, a motherboard connector, a computer body with a computer case, a visual display monitor, a cover, and a power source port, said motherboard connector located at a front of said computer, said power source port located at said front of said computer;

a first peripheral component to be connected or disconnected to said computer, said first peripheral component having a memory addressable by said computer, a slide moving said first peripheral component, an aperture securing after connecting to said computer, and a peripheral component connector connecting to said motherboard connector, said computer of having a greater number of functions upon connection to said first peripheral component; and a second peripheral component having a power source port, said second peripheral component connecting and disconnecting to said computer, providing electrical energy to drive said computer and said first peripheral component, said computer having greater functions and functioning for a longer period of time upon connection to said second peripheral component;

a latch causing said first peripheral component to be detached from, attached to, and secured to said computer upon a user manipulation, said latch comprising a first protrusion providing positions of in and out of said aperture, a second protrusion for applying force to a front of said first peripheral component, a torsion spring having a first end detained by a first detent, a hook-shaped rotatable lever controlling said position of said first protrusion by applying force to said first protrusion upon said user manipulation, a second detent having a hook and a boss, and an indented handle, said rotatable lever connecting said first peripheral component to said computer by inserting said first protrusion to said aperture, and pushing a back side of said first peripheral component upon said user manipulation, said rotatable lever detaching said first peripheral component from said computer by pushing said front of said first peripheral component.

* * * * *